(12) United States Patent
Herve et al.

(10) Patent No.: US 8,801,056 B2
(45) Date of Patent: Aug. 12, 2014

(54) MOTOR VEHICLE FRONT OR REAR ASSEMBLY COMPRISING AN ELEMENT FOR FASTENING TRIM ELEMENTS TO THE BODY SHELL OF THE VEHICLE

(75) Inventors: Jérôme Herve, Belfort (FR); Yves Schultz, Belfort (FR)

(73) Assignee: Faurecia Bloc Avant, Nanterre (FR)

( * ) Notice: Subject to any disclaimer, the term of this patent is extended or adjusted under 35 U.S.C. 154(b) by 0 days.

(21) Appl. No.: 13/879,232

(22) PCT Filed: Oct. 12, 2011

(86) PCT No.: PCT/FR2011/052381
§ 371 (c)(1),
(2), (4) Date: Jul. 3, 2013

(87) PCT Pub. No.: WO2012/049425
PCT Pub. Date: Apr. 19, 2012

(65) Prior Publication Data
US 2013/0285396 A1    Oct. 31, 2013

(30) Foreign Application Priority Data

Oct. 12, 2010  (FR) ...................................... 10 58259

(51) Int. Cl.
*B60R 19/00*  (2006.01)
*B60R 13/02*  (2006.01)
(52) U.S. Cl.
CPC ................................. *B60R 13/0206* (2013.01)
USPC .......................................................... 293/1
(58) Field of Classification Search
CPC ...................................................... B63B 17/02
USPC .................. 293/1; 296/1.08, 146.7; 52/716.5, 52/288.1; 280/728.2; 411/508, 510; 24/289, 297; 227/142, 8, 9
See application file for complete search history.

(56) References Cited

U.S. PATENT DOCUMENTS 4,003,180 A * 1/1977 Messuri ...................... 52/718.05
5,613,327 A * 3/1997 Sauve .......................... 49/490.1
(Continued)

FOREIGN PATENT DOCUMENTS

| EP | 1604886 | 12/2005 |
|---|---|---|
| FR | 2816577 | 5/2002 |
| FR | 2838096 | 10/2003 |

OTHER PUBLICATIONS

International Search Report of the International Searching Authority mailed on Jun. 13, 2012, along with its English translation, issued in connection with International Patent Appln. No. PCT/FR2011/052381 (5 pages).

(Continued)

*Primary Examiner* — Kiran B Patel
(74) *Attorney, Agent, or Firm* — McCarter & English, LLP

(57) ABSTRACT

The motor vehicle front assembly according to the invention comprises a first relatively deformable trim element, and a second relatively deformable trim element, separate from the first.

The front assembly comprises a rigid fastener element for fastening trim elements to the body shell of the vehicle, the fastener element comprising:

fastener means for fixing the fastener element to the body shell of the vehicle;

fastener means for fixing the first trim element to the fastener element; and fastener means for fixing the second trim element to the fastener element;

the fastener element forming a one-piece assembly.

12 Claims, 3 Drawing Sheets

(56) References Cited

U.S. PATENT DOCUMENTS

| | | | |
|---|---|---|---|
| 5,836,113 A * | 11/1998 | Bachman | 52/94 |
| 6,523,886 B2 * | 2/2003 | Hoffner et al. | 296/203.02 |
| 7,891,850 B2 * | 2/2011 | Breisacher | 362/505 |
| 7,914,070 B2 * | 3/2011 | Fayt | 296/193.09 |
| 8,029,049 B2 * | 10/2011 | Ito et al. | 296/198 |
| 8,328,259 B2 * | 12/2012 | Matsuzaki et al. | 296/1.08 |
| 8,348,321 B2 * | 1/2013 | Yamazaki et al. | 296/1.08 |
| 8,567,853 B2 * | 10/2013 | Huber et al. | 296/193.09 |
| 2005/0088015 A1 * | 4/2005 | Kishikawa et al. | 296/193.09 |
| 2006/0001279 A1 * | 1/2006 | Takahashi | 293/154 |
| 2013/0186018 A1 * | 7/2013 | Grandgirard et al. | 52/204.72 |

OTHER PUBLICATIONS

PCT International Preliminary Report on Patentability and Written Opinion mailed on Jun. 13, 2012, with English translation, in connection with International Application No. PCT/FR2011/052381 (9 pages).

* cited by examiner

MOTOR VEHICLE FRONT OR REAR ASSEMBLY COMPRISING AN ELEMENT FOR FASTENING TRIM ELEMENTS TO THE BODY SHELL OF THE VEHICLE

RELATED APPLICATIONS

This application is a U.S. National Phase Application under 35 U.S.C. 371 of International Application No. PCT/FR2011/052381 filed Oct. 12, 2011, which was published on Apr. 19, 2012 under International Publication Number WO 2012/049425 A2, which claims the benefit of French Patent Application No. 1058259 filed on Oct. 12, 2010. The disclosures of these applications are incorporated herein by reference in their entireties.

The present invention relates to a motor vehicle front or rear assembly, of the type comprising a first relatively deformable trim element, and a second relatively deformable trim element, separate from the first.

Such an assembly is for example designed to trim a front or rear motor vehicle face so as to conceal the structure of the vehicle and provide a satisfactory visual appearance for the vehicle. The concerned trim elements are generally a fender and the skin of the vehicle bumper.

However, new vehicle fenders, which are generally made from plastic, being relatively flexible, managing the play between the fenders and the bumper skin is problematic. It is difficult to maintain a controlled gap between the two trim elements, which can deteriorate the visual appearance of the motor vehicle. Furthermore, due to their flexibility, the trim elements may vibrate under the effect of air flows, which can cause unpleasant noises.

One aim of the invention is to propose a motor vehicle front or rear assembly suitable for reducing the play between various parts of the assembly, and in particular to reduce the play between trim parts of the vehicle, while limiting the manufacturing cost of that assembly.

To that end, the invention relates to a motor vehicle front or rear assembly of the aforementioned type, characterized in that the front or rear assembly comprises a rigid fastener element for fastening trim elements to the body shell of the vehicle, the fastener element comprising:

fastener means for fixing the fastener element to the body shell of the vehicle;
fastener means for fixing the first trim element to the fastener element; and
fastener means for fixing the second trim element to the fastener element;

the fastener element forming a one-piece assembly.

The front or rear assembly according to the invention may comprise one or more of the following features, considered alone or according to all technically possible combinations:

the fastener element includes a fastener panel on which the first and second trim elements are fastened;
the fastener element is fastened to the body of the vehicle by means of the fastener panel only;
said front or rear assembly also comprises a headlight insert and the fastener assembly comprises a headlight insert holder to support the headlight insert;
the headlight insert holder is connected by one end to the fastener panel;
the fastener element comprises a stiffening part stiffening the fastener element, said stiffening part being connected to the fastener panel and the headlight insert holder;
the first trim element defines a reception window for reception of the headlight insert, the headlight insert holder extending along the lower edge of the reception window;
the fastener element includes an integral retaining tab suitable for cooperating with a raised portion of the of first trim element so as to limit the separation between the upper and lower edges of the reception window for reception of the headlight insert;
a spring element serves as an interface with the tab and the raised portion;
the fastener element is clipped to at least one of the first and second trim elements;
the first trim element is a fender, made from plastic, of the motor vehicle, the second trim element being a bumper skin of the vehicle.

The invention also relates to a motor vehicle comprising at least one front or rear assembly as defined above.

The present invention will be better understood upon reading the following description, provided solely as an example, and done in reference to the appended figures, in which.

Figure 1:
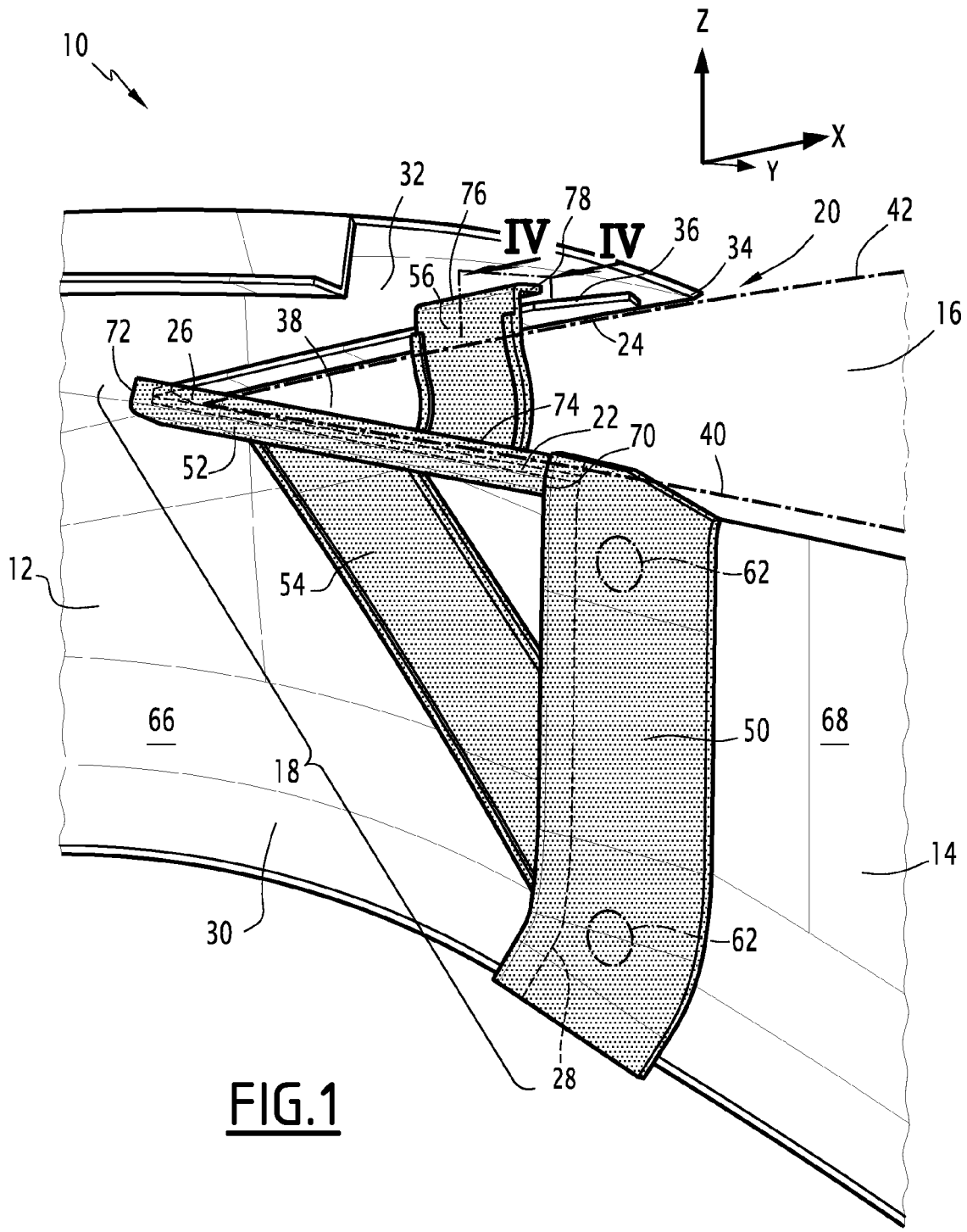
FIG. 1 is an elevation view, from the inside of the motor vehicle, of a left portion of the front assembly according to the invention.
Figure 2:
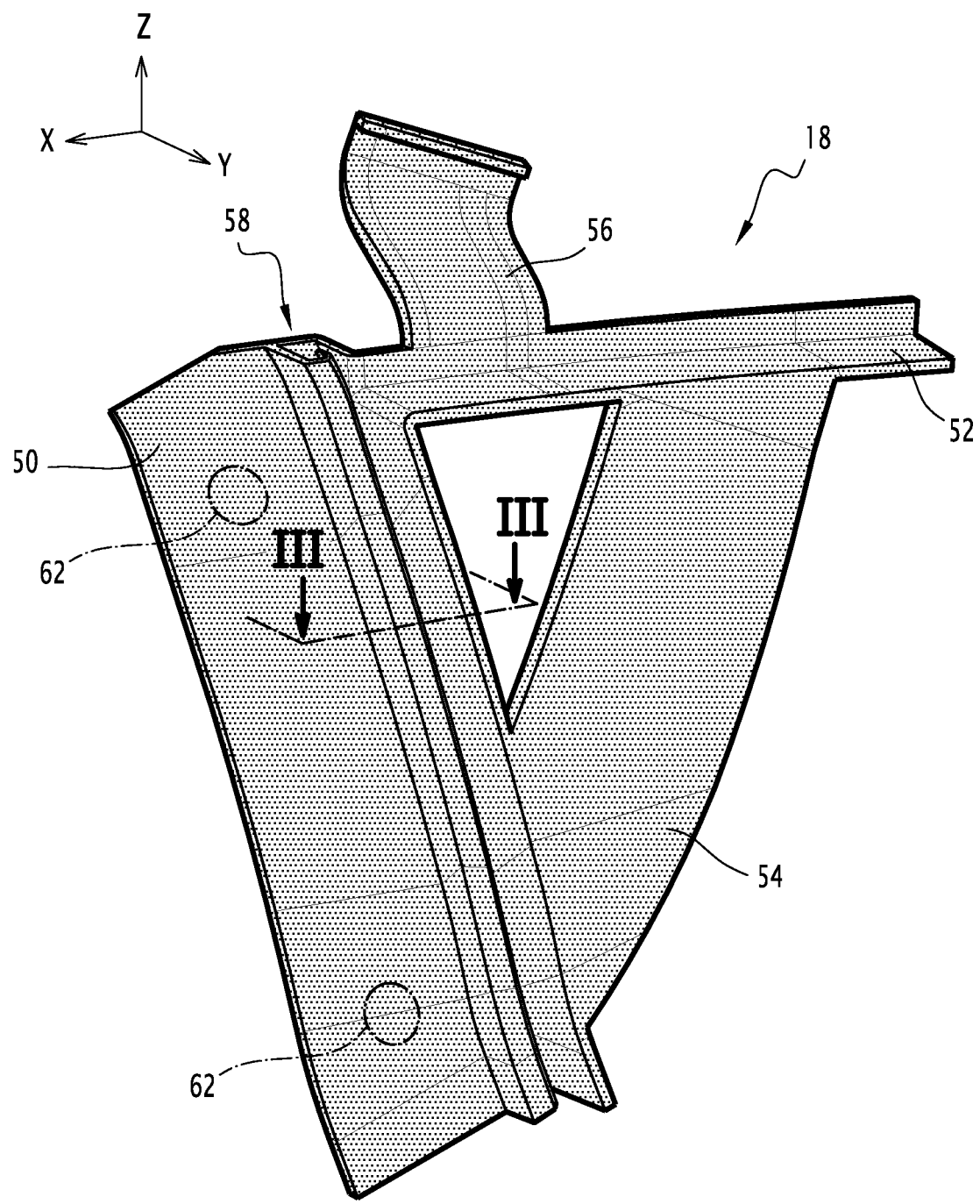
FIG. 2 is an elevation view, from outside the vehicle, of a rigid fastening element of the assembly of FIG. 1.

Hereafter, the orientation terms are to be understood relative to the usual orthogonal reference for motor vehicles, shown in FIGS. 1 and 2, and in which one can see:

a longitudinal axis X, horizontal, extending from back to front;
a transverse axis Y, horizontal, extending from right to left; and
a vertical axis Z extending from bottom to top.

The front assembly 10, shown in FIG. 1, comprises a first relatively deformable trim element 12, a second relatively deformable trim element 14, separate from the first trim element 12, a headlight insert 16 and a rigid fastener element 18 fastening the trim elements 12, 14 to a body element (not shown) of the motor vehicle.

The first trim element 12 is typically a front fender of the motor vehicle. It defines a lateral face of the vehicle. It is made from relatively flexible plastic and has a concave shape whereof the concavity is oriented toward the inside of the vehicle.

As shown in FIG. 1, the fender 12 defines a receiving window 20 receiving the headlight insert 16.

In the illustrated example, the receiving window 20 is in the form of a V-shaped notch open toward the front. It comprises a lower edge 22 and an upper edge 24 that come together toward the back while delimiting a bottom 26 of the receiving window 20. The receiving window 20 extends along a front vertical edge 28 of the fender 12 and emerges in that vertical edge 28.

The receiving window 20 separates the body 30 of the fender 12 from an upper tongue 32 of the fender 12, protruding from the body 30 toward the median longitudinal vertical plane of the vehicle.

The body 30 defines the lower edge 22 of the receiving window 20.

The tongue 32 defines the upper edge 24 of the receiving window 20. It is integral with the body 30. It has a front free end 34 and an inner raised portion 36 near the upper edge 24.

In the illustrated example, the raised portion 36 is a rib, protruding from the tongue 32 toward the inside of the vehicle and extending along the upper edge 24.

The second trim element 14 is typically a bumper skin of the vehicle. It is designed to be placed across from a bumper beam of the vehicle and defines a front face of the vehicle.

The skin 14 is made from a relatively flexible plastic.

Preferably, the skin 14 is in contact with the fender 12 along the vertical edge 28.

The headlight insert 16 is partially housed in the receiving window 20. It has a shape complementary to that of the receiving window 20. In the illustrated example, a lateral end 38 of the headlight insert 16 is thus V-shaped.

The headlight insert 16 comprises a lower insert edge 40, in contact with the lower edge 22 of the receiving opening 20, and an upper insert edge 42, in contact with the upper edge 24 of the receiving opening 20.

The fastening element 18 forms a rigid single-piece assembly. It comprises a fastener panel 50 on which the fender 12 and the skin 14 are fastened, a headlight insert holder 52 to support the headlight lens 16, a stiffening part 54 and a retaining tab 56 retaining the upper edge 24. The fastener panel 50, the holder 52, the stiffening part 54 and the tab 56 are integral.

As shown in FIG. 2, the fastening element 18 also includes means 58 for fastening the fender 12 and the skin 14 to the fastener element 18, as well as means 62 for fastening the fastener element 18 to an element of the body of the motor vehicle (not shown).

The fastener panel 50 supports the fastener means 58 and 62.

The fastener means 62 are all located at the fastener panel 50. The fastener element 18 is thus fastened to the body of the vehicle by means of the fastener panel 50 alone.

The fastener means 62 for fastening the trim element 18 to the body of the vehicle are for example holes suitable for receiving screws or fastening rivets.

Figure 3:
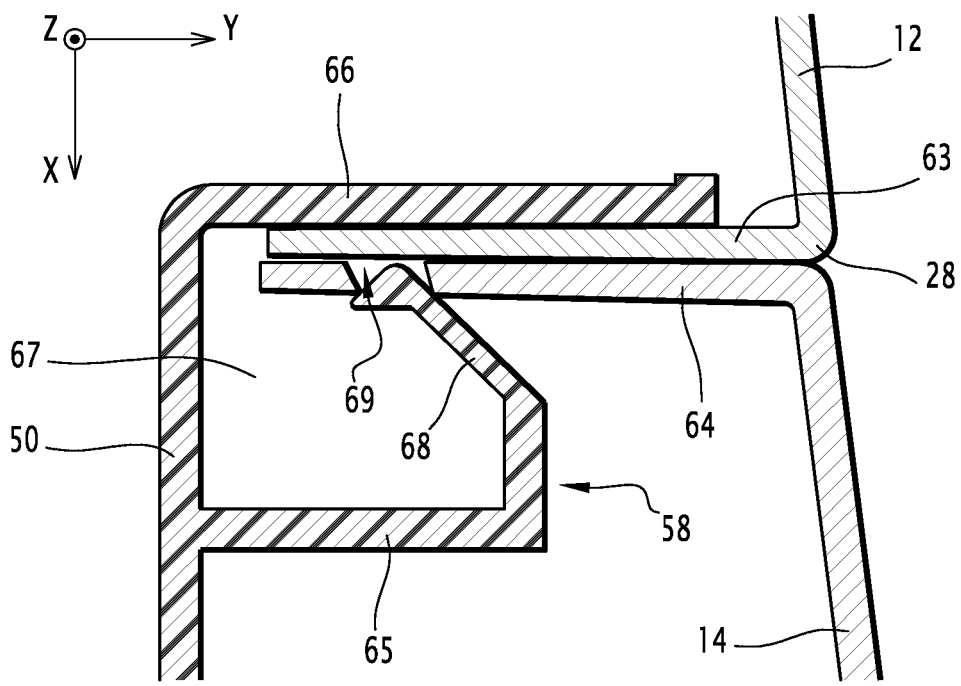
FIG. 3 is a cross-sectional view, along a plane marked III in FIG. 2, of a detail of FIG. 2, and the fastening of a fender and a bumper skin on said fastener elements.

As shown in FIG. 3, the fender 12 comprises a first rim 63 protruding toward the inside of the vehicle, and the bumper skin 14 comprises a second rim 64 protruding toward the inside of the vehicle, along the first rim 63. The first rim 63 delimits the vertical edge 28 of the fender 12.

The fastener means 58 comprise a pair of parallel ribs 65, 66 protruding from an outer face of the fastener panel 58 toward the outside of the vehicle and each extending substantially vertically. Said ribs 65, 66 delimit a slit 67 between them that is elongated substantially vertically and open toward the outside of the vehicle. The ribs 65, 66 are spaced far enough apart from each other for the slit 67 to be able to receive the rims 63, 64 of the fender 12 and the bumper skin 14.

A rib 65 bears a plurality of flexible blades 68, each adapted to cooperate with an opening 69 formed in one 64 of the rims 63, 64. The other rib 66 is adapted to serve as a bearing for the other rim 63. When the first and second rims 63, 64 are engaged together in the slit 67 and the blades 68 are engaged in the openings 69, then the bumper skin 14 is clipped to the fastener panel 50 of the fastener support 18, and the fender 12 is firmly gripped between the second rim 64 and the rib 66.

Alternatively, the fastener means 58 may assume any other form allowing the fender 12 and the skin 14 to be fastened to the fastener element 18. Also alternatively, part of the fastener means 58 is supported by the headlight insert holder 52 and/or by the stiffening part 54.

Returning to FIG. 1, the headlight insert holder 52 extends substantially horizontally along the lower edge 22 of the receiving window 20. It is elongated between a first end 70 and a second end 72 in a direction parallel to the lower edge 22 of the receiving window 20.

The support 52 is connected by the first end 70 to the fastener panel 50.

The support 52 is for example a beam.

The stiffening part 54 extends obliquely between the fastener panel 50 and the support 52. It is fastened to the fastener panel 50 and the support 52.

In the illustrated example, the stiffening part 54 is a panel. It is curved, with a concavity oriented toward the inside of the vehicle, and extends substantially against the body 30 of the fender 12. It makes it possible to stiffen the body 30.

The tab 56 has a fixed end 74, fastened to the headlight insert holder 52, and an upper free end 76.

The tab 56 protrudes upward from the holder 52 and is adapted to cooperate with the raised portion 36 so as to limit the separation of the lower 22 and upper 24 edges of the receiving window 20 and keep the lower 40 and upper 42 insert edges of the headlight insert 16 respectively against the lower edge 22 and the upper edge 24 of the receiving window 20.

To that end, the tab 56 has, at the free end 76, a projection 78 protruding from the free end 76 toward the outside of the vehicle. This projection is designed to come into contact with the raised portion 36 to limit the separation of the lower 22 and upper 24 edges of the receiving window 20.

Figure 4:
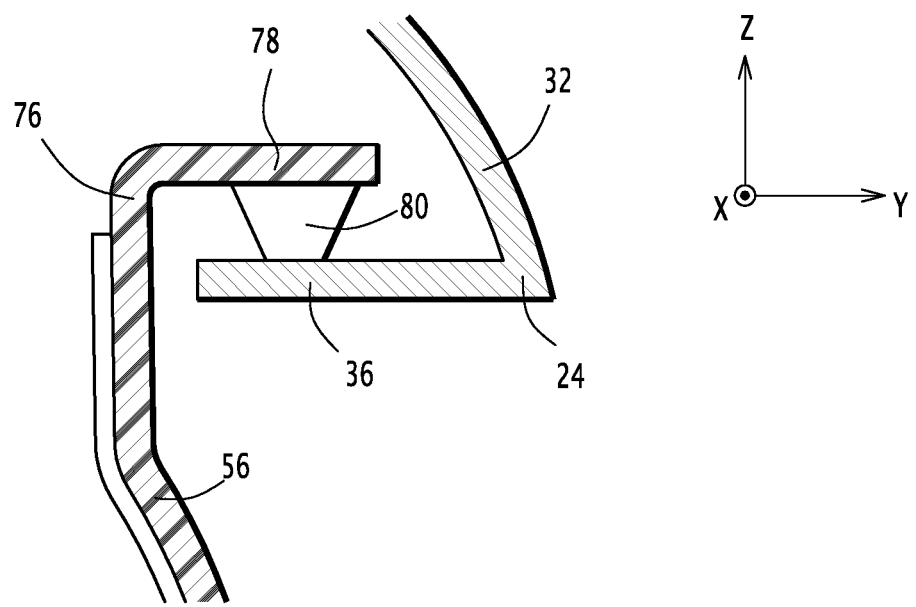
FIG. 4 is a cross-sectional view, along a plane marked IV in FIG. 1, of a detail of FIG. 1.

Preferably, as shown in FIG. 4, a spring element 80 acts as the interface between the raised portion 36 and the tab 56. The spring element 80 is for example an elastic blade inserted between the projection 78 and the raised portion 36 and integral with the projection 78 or the raised portion 36.

Alternatively, the projection 78 of the raised portion 36, through its own elasticity, forms the spring element 80.

Owing to the invention, the play between the headlight lens and the first and second trim elements on the one hand, and between the first and second trim elements, at the interface between those two elements, on the other hand, is significantly reduced.

Furthermore, the fender is stiffened, which makes it possible to limit the play caused by the deformation of that trim element.

Lastly, these functions are performed by a single one-piece part, which makes it possible to simplify the assembly of the front or rear assembly and to reduce the manufacturing costs.

The invention claimed is:

1. A motor vehicle front or rear assembly comprising:
   a first deformable trim element;
   a second deformable trim element, separate from the first trim element;
   a rigid fastener element for fastening the first and second trim elements to a body shell of the vehicle, the fastener element comprising:
   fastener means for fixing the fastener element to the body shell of the vehicle;
   fastener means for fixing the first trim element to the fastener element; and
   fastener means for fixing the second trim element to the fastener element;
   the fastener element forming a one-piece assembly.

2. The front or rear assembly according to claim 1, wherein the fastener element includes a fastener panel on which the first and second trim elements are fastened.

3. The front or rear assembly according to claim 2, wherein the fastener element is fastened to the body of the vehicle by means of the fastener panel only.

4. The front or rear assembly according to claim 1, further comprising a headlight insert, wherein a headlight insert holder supports the headlight insert.

5. The front or rear assembly according to claim 4, wherein the fastener element includes a fastener panel on which the first and second trim elements are fastened, and the headlight insert holder is connected by one end to the fastener panel.

6. The front or rear assembly according to claim 5, wherein the fastener element comprises a stiffening part for stiffening the fastener element, said stiffening part being connected to the fastener panel and the headlight insert holder.

7. The front or rear assembly according to claim 4, wherein the first trim element defines a reception window for reception of the headlight insert, the headlight insert holder extending along a lower edge of the reception window.

8. The front or rear assembly according to claim 7, wherein the fastener element includes an integral retaining tab suitable for cooperating with a raised portion of the first trim element to limit the separation between the upper and lower edges of the reception window for reception of the headlight insert.

9. The front or rear assembly according to claim 8, wherein a spring element serves as an interface with the tab and the raised portion.

10. The front or rear assembly according to claim 1, wherein the fastener element is clipped to at least one of the first and second trim elements.

11. The front or rear assembly according to claim 1, wherein the first trim element is a fender, made from plastic, of the motor vehicle, the second trim element being a bumper skin of the vehicle.

12. A motor vehicle comprising at least one front or rear assembly according to claim 1.

* * * * *